United States Patent Office 3,605,803
Patented Sept. 20, 1971

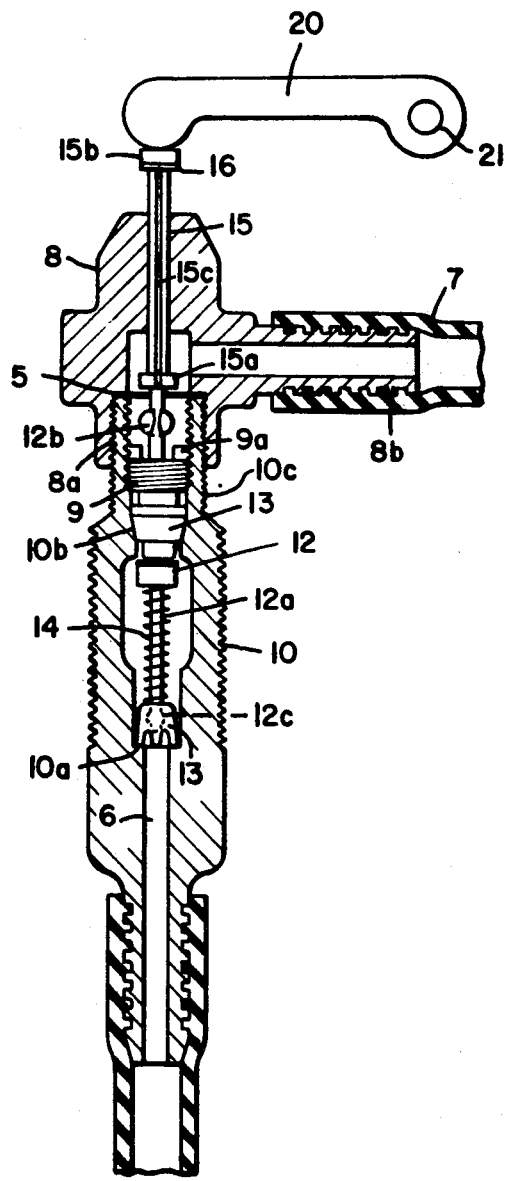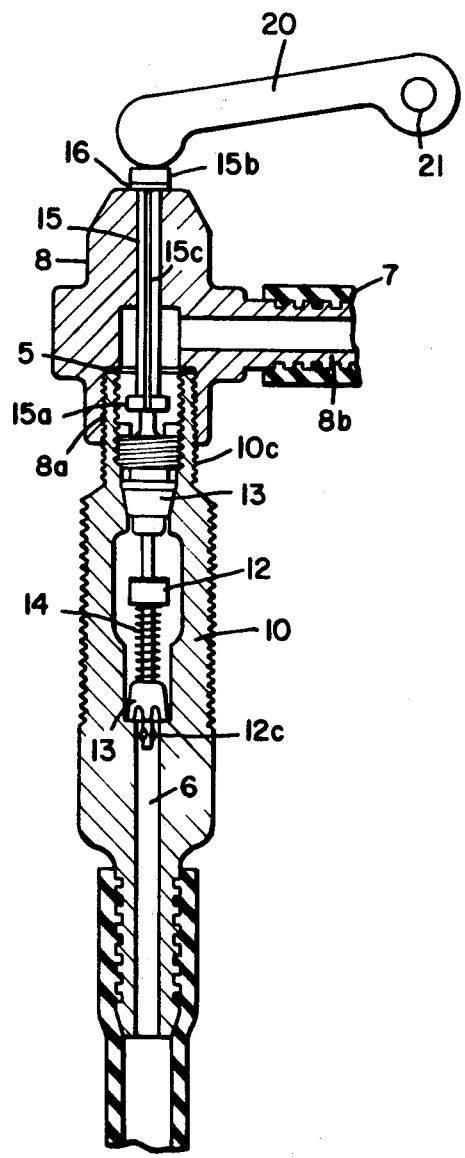
FIG_1  FIG_2
INVENTOR.
BROOKS WALKER

3,605,803
VALVE
Brooks Walker, 1280 Columbus Ave.,
San Francisco, Calif. 94133
Filed Feb. 24, 1970, Ser. No. 13,549
Int. Cl. F16k *11/04*
U.S. Cl. 137—596.1            4 Claims

ABSTRACT OF THE DISCLOSURE

This invention pertains to a very simple through valve using the insides of an ordinary tire valve with a modified cap with outlet port and incorporating a plunger with a groove or flat to provide a controlled bleed when the plunger is not fully depressed and providing a non-metallic seat to close off said bleed when the plunger is fully depressed for controlled flow of a fluid such as suction from the intake of an engine to operate a suction operated motor including a diaphragm and enclosure with the diaphragm operating against a spring as in a suction operated spark advance or ventilating temperature control.

---

An object of the invention is as stated in the abstract.

Another object is to use a simple and very tight closing high production low cost tire valve inside to control a sealed through flow to a fluid operated motor of other fluid flow control and also provide a simple actuator in a modified cap with a controlled bleed when the through valve is in closed position.

Other features will be pointed out in the accompanying specification and claims.

I have illustrated my invention by way of example in the accompanying drawings, in which:

FIG. 1 is a side elevation partly in section of one form of the invention showing the through valve in closed position and the bleed in the operating stem open.

FIG. 2 is a view similar to FIG. 1 in which the through valve is in open position and the bleed sealed off.

In all figures like numerals of reference refer to corresponding parts.

In all figures I have shown a valve body 10, a valve 12, with a non-metallic seat 13. Valve stem 12a is surrounded by a spring 14 which urges valve 12 upward with stem 12a. The enlargements 12c and 12b retain spring 14 when the valve is out of the valve housing. The lower end of spring 14 bears against crown supporting element 13 which is supported by shoulder 10a. Valve body seal element 13 is urged against taper 10b by threaded element with operating lugs 9a in the usual tire valve construction. Plunger 15 has a head 15a at the lower end that abuts against valve stem end 12b but needs exterior pressure as $H_g$ manual or by lever 20 to open valve 12 against spring 14 for controlled through flow from passage 6 past open valve 12 to outlet 7. With plunger 15 fully depressed as by arm 20 or by hand the seal element 16 preferably nonmetallic will seal the bleed normally past groove 15c which extends through head 15a to shut off such bleed when operating as a through valve, as in FIG. 2, but providing a controlled bleed from line 7 past groove 15c when in the closed through valve position, as shown in FIG. 1. Arm 20 may be operated by shaft 21 by mechanism not shown. The operating plunger 15 is supported in cap 8 which is secured to valve body 10 at threads 10c and 8a. Cap 8 supports outlet 8b that is attached to outlet tube 7. Cap 8 also supports plunger 15 with bleed passage 15c which is open to bleed in through valve 12 closed position as shown in FIG. 1 and closed to bleed in the through valve 12 open position as shown in FIG. 2. The cap is sealed to the stem by screwing down against washer 5.

I have illustrated my inventions in these various forms; however, many other variations may be possible within the scope of this invention.

To those skilled in the art to which this invention relates many changes in construction and widely differing embodiments and applications of the invention will suggest themselves without departing from the spirit and scope of the invention. The disclosures and description herein are purely illustrative and are not intended to be in any sense limiting.

I claim:

1. A tire valve stem and tire valve insides, a cap for said valve stem, an operating plunger for said valve, said cap including an outlet extension and a sliding support for said plunger, said plunger having a valve portion at the outside of said cap, a bleed passage open when said tire valve and said plunger are in the tire valve closed position to provide a bleed to said outlet extension and said valve closing said bleed when said plunger is in the tire valve open position.

2. A device as described in claim 1, in which said bleed passage is formed in said plunger.

3. A device as described in claim 1, in which there is a groove in said plunger to form part of said bleed passage.

4. A device as defined in claim 1, in which said valve on said plunger has a non-metallic face to seal said bleed in through valve open position.

References Cited

UNITED STATES PATENTS

| | | | |
|---|---|---|---|
| 1,511,554 | 10/1924 | Woodring | 137—596.1 |
| 1,541,913 | 6/1925 | Bartholomew | 137—596.1X |
| 1,563,871 | 12/1925 | Roller | 137—233 |
| 2,075,341 | 3/1937 | Goodman | 137—596.1X |

M. CARY NELSON, Primary Examiner

R. J. MILLER, Assistant Examiner

U.S. Cl. X.R.

137—454.5